(12) United States Patent
Sheu et al.

(10) Patent No.: US 7,114,836 B2
(45) Date of Patent: Oct. 3, 2006

(54) MOTORCYCLE AND TAIL LIGHT STRUCTURE THEREOF

(75) Inventors: Wen-Ching Sheu, Chunli (TW); Chia-Hsien Lee, Chunli (TW)

(73) Assignee: Yamaha Motor R&D Taiwan Co., Ltd., Taiwan (CN)

( * ) Notice: Subject to any disclaimer, the term of this patent is extended or adjusted under 35 U.S.C. 154(b) by 0 days.

(21) Appl. No.: 10/383,827

(22) Filed: Mar. 7, 2003

(65) Prior Publication Data
US 2004/0170024 A1    Sep. 2, 2004

(30) Foreign Application Priority Data
Feb. 27, 2003 (TW) .............................. 92104215 A

(51) Int. Cl.
  B62J 6/00     (2006.01)
  F21V 21/00   (2006.01)
(52) U.S. Cl. .................... 362/473; 362/540; 340/475
(58) Field of Classification Search ............... 362/473, 362/474, 475, 496, 540, 541, 506; 340/432, 340/473, 475; 280/282, 284.4
See application file for complete search history.

(56) References Cited

U.S. PATENT DOCUMENTS

| | | | | |
|---|---|---|---|---|
| 1,740,588 A | * | 12/1929 | Hamilton | 362/516 |
| 3,696,334 A | * | 10/1972 | Demeter | 340/432 |
| 4,204,191 A | * | 5/1980 | Daniels | 340/432 |
| 4,311,261 A | * | 1/1982 | Anderson et al. | 224/418 |
| 4,790,087 A | * | 12/1988 | Hamada et al. | 40/204 |
| 4,800,980 A | * | 1/1989 | Hideo et al. | 180/225 |
| 5,355,746 A | * | 10/1994 | Lin | 224/420 |
| 5,406,465 A | * | 4/1995 | Farchione | 362/473 |
| 5,418,697 A | * | 5/1995 | Chiou | 362/473 |
| 5,713,653 A | * | 2/1998 | White et al. | 362/473 |
| 6,053,626 A | * | 4/2000 | Zagrodnik et al. | 362/473 |
| 6,099,151 A | * | 8/2000 | Tlustos | 362/473 |
| 6,461,017 B1 | * | 10/2002 | Selkee | 362/249 |
| 6,538,567 B1 | * | 3/2003 | Stewart | 340/475 |
| 6,585,072 B1 | * | 7/2003 | Scherbarth | 180/219 |
| 6,592,242 B1 | * | 7/2003 | Scaccia | 362/473 |

* cited by examiner

*Primary Examiner*—John Anthony Ward
(74) *Attorney, Agent, or Firm*—Ladas & Parry

(57) ABSTRACT

The present invention discloses a tail light structure of a motorcycle/scooter and a motorcycle/scooter equipped with the tail light structure, which can provide a better indication of the rear indicators for safe driving. The tail light structure includes a base and a tail light, and the base can be connected to the rear cover and the fender of the motorcycle as an integrated module to improve rigidity. The base includes a first securing plate, a second securing plate and an extending plate, the extending plate including a first extending portion and a second extending portion, the front of the second securing plate being connected approximately perpendicular to the bottom of the first securing plate, and the first extending portion being perpendicularly disposed below the rear of the second securing plate. The top of the second extending portion is connected to the bottom of the first extending portion, and the second extending portion backwardly tilts at an angle to the first extending portion. The tail light is snugly equipped on the structure constituted by the first securing plate and the second securing plate.

14 Claims, 8 Drawing Sheets

MOTORCYCLE AND TAIL LIGHT STRUCTURE THEREOF

BACKGROUND OF THE INVENTION (A) Field of the Invention

The present invention relates to a tail light structure of a motorcycle/scooter and a motorcycle/scooter having the tail light structure, more specifically, to a tail light structure connecting a rear cover and a fender, and a motorcycle/scooter having the tail light structure.

(B) Description of Related Art

As shown in FIG. 1, the tail light 11 and two rear indicators 12 of a motorcycle having less displacement, such as a scooter, are usually embedded within the rear cover 13, so three openings have to be made on the rear cover 13 to secure the tail light 11, rear indicators 12 and receive the accompanying wiring. The fender 14 and the license frame 15 of the motorcycle are secured on a frame (not shown) beneath the rear cover 13 by bolts.

The distance of the two rear indicators 12 of the above mentioned tail light structure is limited by the rear cover 13, so the rear indicators 12 cannot easily be made in a large size. Therefore, it is probably difficult to differentiate the two rear indicators 12 at a far distance due to the insufficient brightness of the indicators 12.

Furthermore, because the rear cover 13 and the fender 14 are individually secured on the motorcycle, the rigidity of the integrated structure may be insufficient. Therefore, the fender 14 may be damaged or lowered through vibrations, and dirtied by splashes of mud for a long period of time.

SUMMARY OF THE INVENTION

The main objective of the present invention is to provide a tail light structure of a motorcycle or a scooter with a better indication of the rear indicators for safe driving. Furthermore, the tail light structure of the present invention connects a rear cover and a fender as an integrated module that can achieve better rigidity.

The tail light structure of a motorcycle of the present invention includes a base and a tail light. The base includes a first securing plate, a second securing plate and an extending plate, the extending plate including a first extending portion and a second extending portion, the front of the second securing plate being connected approximately perpendicular to the bottom of the first securing plate, and the first extending portion being perpendicularly disposed below the rear of the second securing plate. The top of the second extending portion is connected to the bottom of the first extending portion, and the second extending portion backwardly tilts at an angle to the first extending portion. The tail light is snugly equipped on the L-shaped like structure constituted by the first securing plate and the second securing plate.

The tail light structure of the present invention can be combined with the rear cover and the fender of the motorcycle to form an integrated module first, and then the integrated module can be equipped on the motorcycle body. Accordingly, the manufacturing process of the motorcycle can be simplified, and the rigidity of integrated components can be well improved.

DETAILED DESCRIPTION OF THE INVENTION

Figure 1:
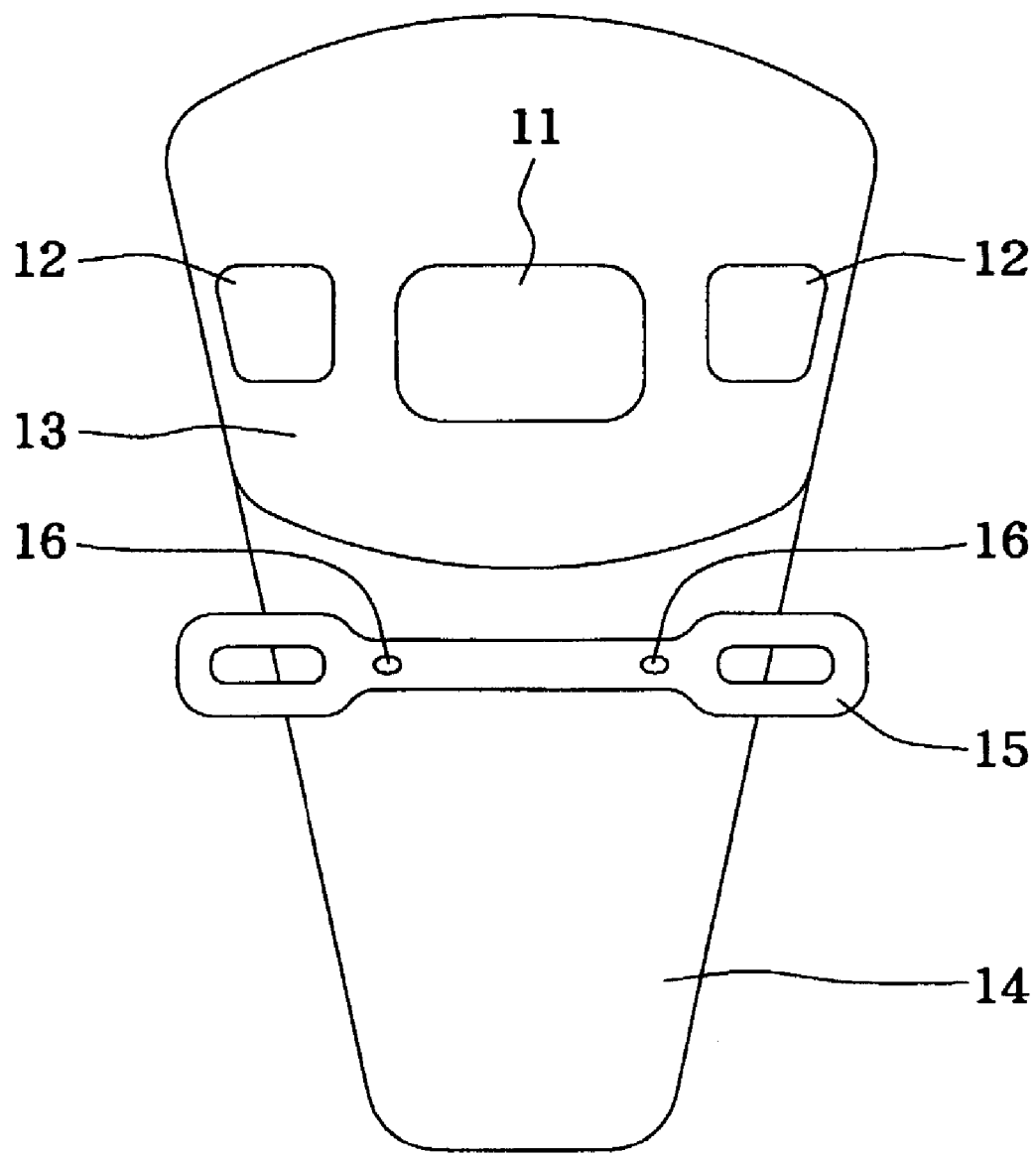
FIG. 1 illustrates a known tail light structure of a motorcycle.
Figure 2:
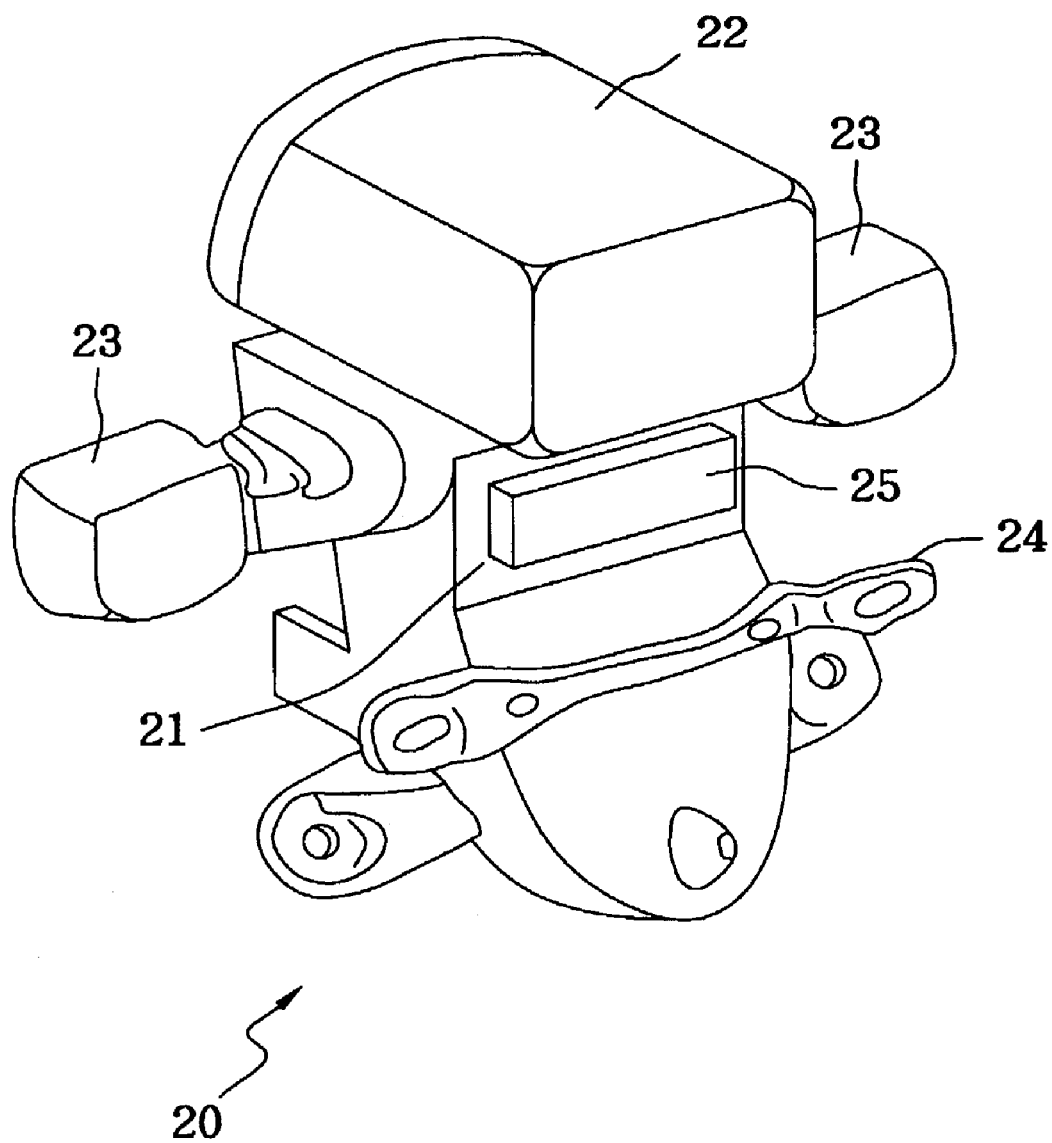
FIG. 2 illustrates the tail light structure of a motorcycle in accordance with the present invention.

FIG. 2 illustrates the rear view of the tail light structure 20 of a motorcycle at a tilted angle, the tail light structure including a base 21, a tail light 22, two rear indicators 23, a license frame 24 and an optical reflection plate 25. The direction headings for the front and the rear of the motorcycle is respectively defined as the front and rear directions hereinafter for clear description.

Figure 3:
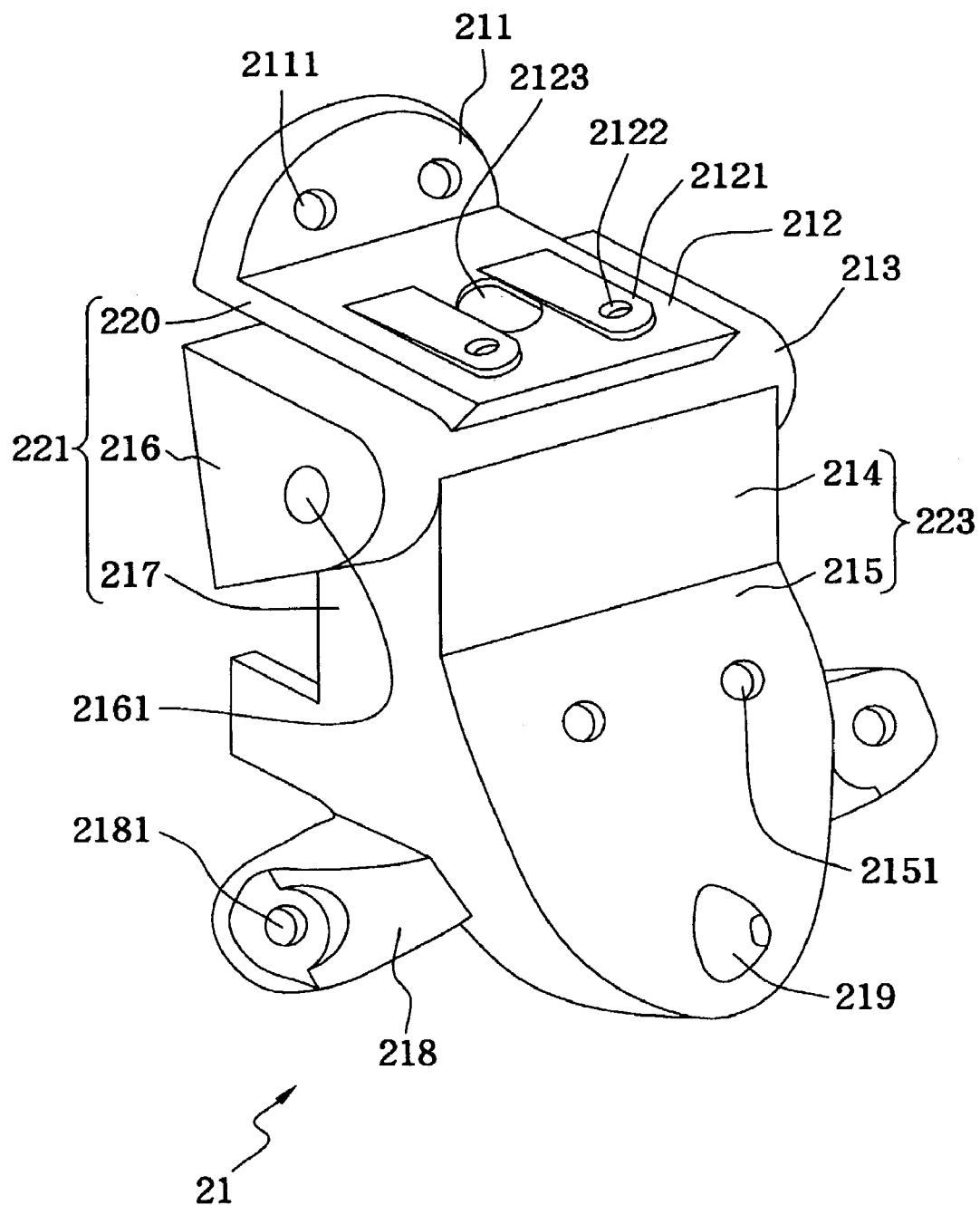
FIG. 3 illustrates the base of the present invention.

FIG. 3 illustrates the details of the base 21, which includes a first securing plate 211, a second securing plate 212, an arc plate 213, an extending plate 223, two fixing bars 218 and two side portions 221. Each side portion 221 is composed of a periphery 220, a first side plate 216 and a second side plate 217. The bottom of the first securing plate 211 is connected approximately perpendicular to the front of the second securing plate 212. The first securing plate 211 includes two holes 2111 to secure the first securing plate 211 to the rear cover of the motorcycle, and the surface of the second securing plate 212 is provided with two bumps 2121 and an opening 2123. Each bump 2121 has a screw hole 2122 for securing the tail light 22, and the opening 2123 can receive the accompanying wiring of the tail light 22. The periphery 220 connects the borders of the first securing plate 211 and the second plate 212, and is approximately perpendicular to them. The extending plate 223 includes a first extending portion 214 and a second extending portion 215. The arc plate 213 is connected to the periphery 220 and the top of the first extending portion 214, and the first extending portion 214 is approximately perpendicular to the second securing plate 212. The top of the second extending portion 215 is connected to the bottom of the first extending portion 214, and the second extending portion 215 tilts backward at an angle approximately 15 degrees to the first extending portion 214. As a matter of fact, the angle between the first and the second extending portions 214, 215 depends on the angle of the second extending portion 215 to the ground, which is usually between 12 to 18 degrees, i.e., the angle between the first extending portion 214 and the second extending portion 215 is also between 12 to 18 degrees. The lower portion of the second extending portion 215 is provided with a convex 219 to support a license plate, and two screw holes 2151 is provided on the upper portion of the second extending portion 215 to secure the license frame 24. The two first side plates 216 are respectively connected to both sides of the arc plate 213, and each first side plate 216 has a screw hole 2161 to secure the rear indicators 23 and to receive the accompanying wiring. The top of the second side plate 217 is connected to the arc plate 213, and the side of the second side plate 217 is connected to the sides of the first extending portion 214 and the second extending portions 215. The second side plate 217 is shaped along the rear cover to form a hollow casing to accommodate the wires of the tail light 22 and the rear indicators 23. The two fixing bar 218 are respectively connected to the lower portion of the two first side plates 217, and each fixing bar 218 has a screw hole 2181 to secure a fender. The base 21 of the embodiment, in addition, is integrally formed by resin, which may be made by metal or other plastics.

Referring to FIG. 2 and FIG. 3, the tail light 22 is snugly secured against the L-shaped structure constituted by the first securing plate 211 and the second securing plate 212. The rear indicators 23 are equipped on the first side plate 216, the license frame 24 is secured on the second extending portion 215, and the optical reflection plate 25 is adhered on the first extending portion 214.

Figure 4:
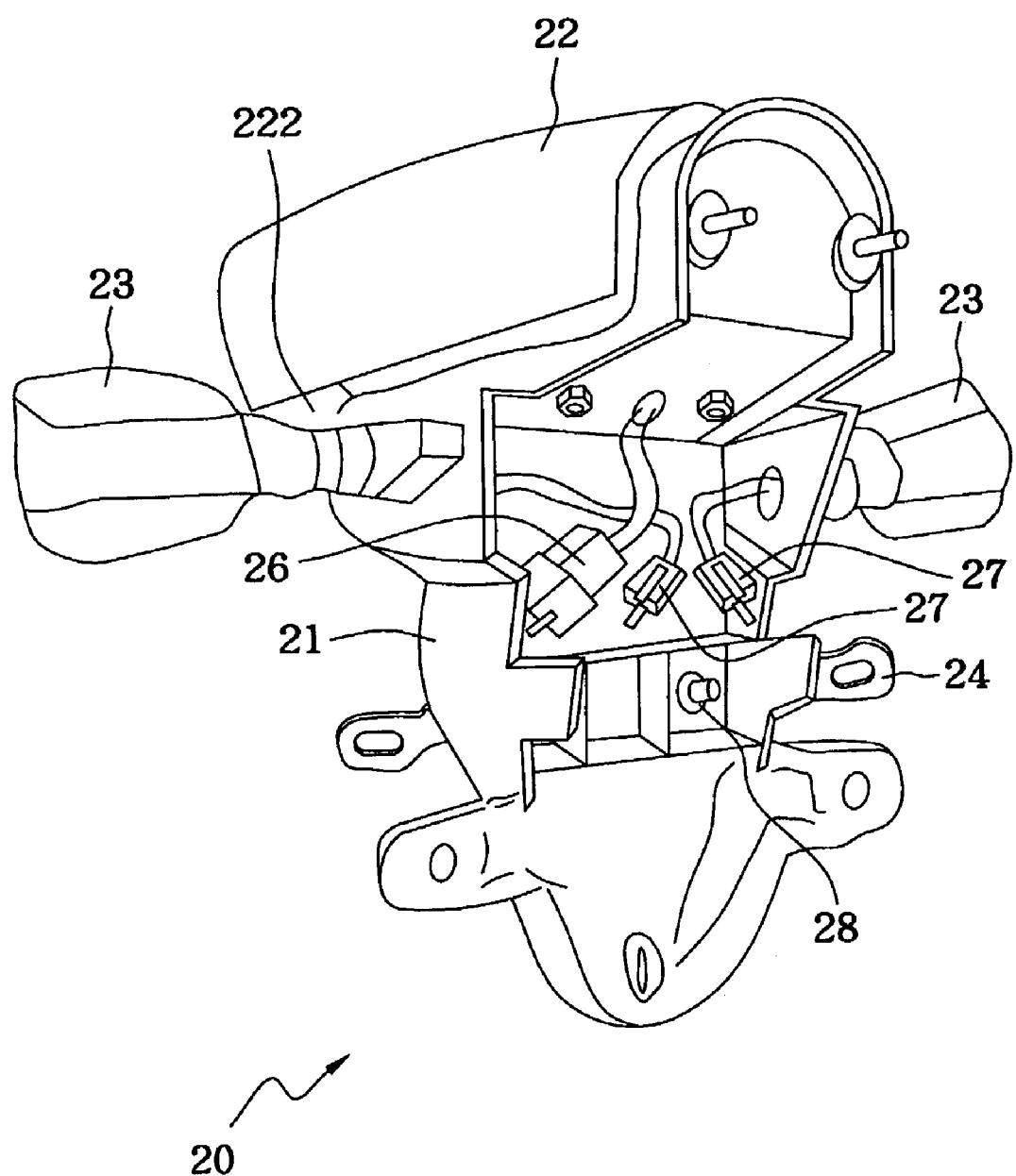
FIG. 4 illustrates the tail light structure of a motorcycle in accordance with the present invention viewed at another angle.

FIG. 4 illustrates the tail light structure 20 viewed at another angle, where a transparent board 222 is set on the rear bottom surface of the tail light 22, so the tail light 22 can light up a license plate disposed below, and thus additional lighting source is unnecessary. The interior of the base 21 can receive the plug 26 of the tail light 22 and the plugs 27 of the rear indicators 27. The license frame 24 is secured to the base 21 by two bolts 28.

Figure 5:
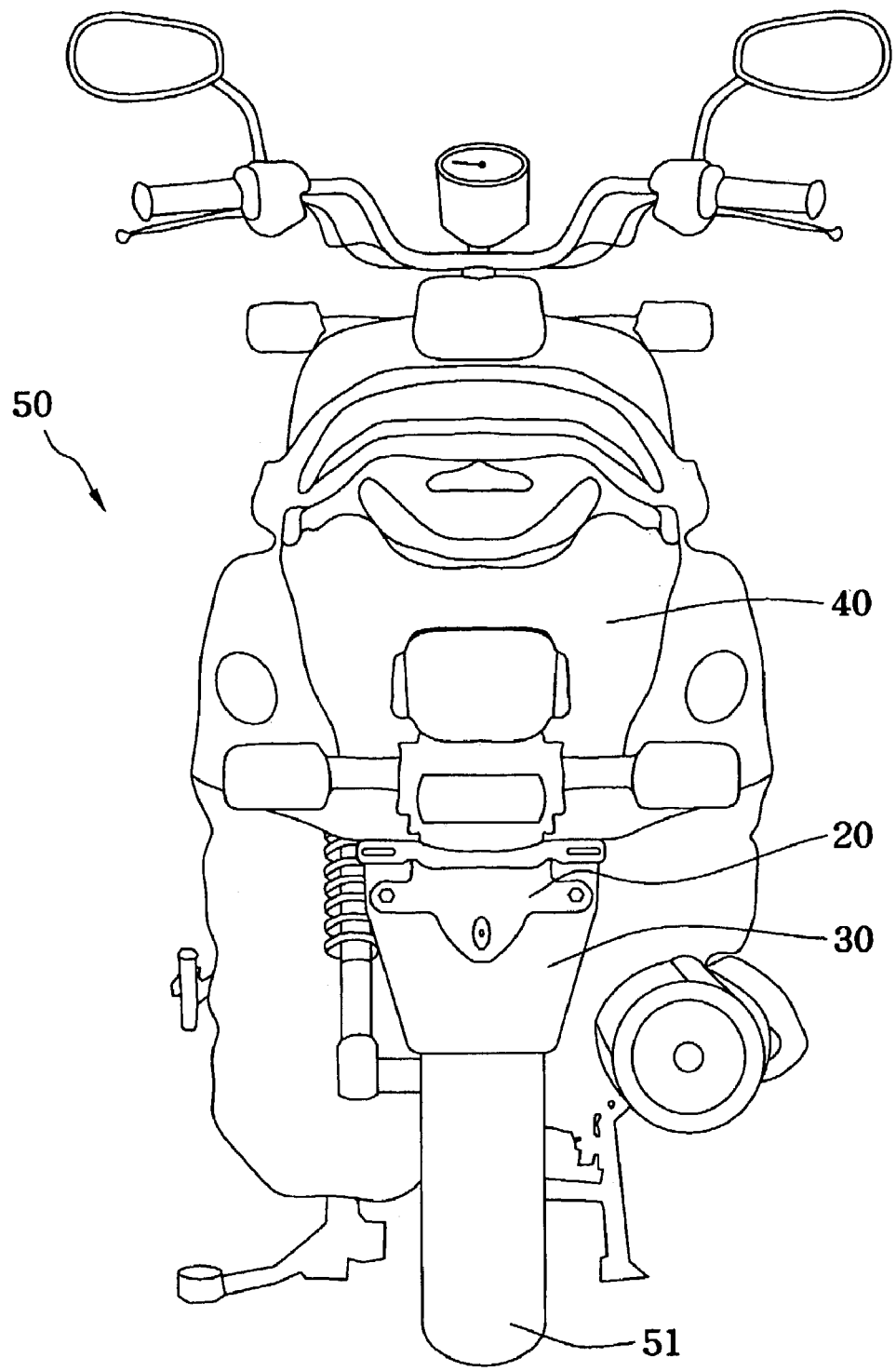
FIG. 5 illustrates a motorcycle equipped with the tail light structure in accordance with the present invention.

FIG. 5 illustrates a motorcycle 50 equipped with the tail light structure 20, a fender 30 and a rear cover 40. The tail light structure 20, the fender 30 and the rear cover 40 can be combined as an integrated module first, and then the integrated module can be connected to an area above the rear wheel 51 of the motorcycle 50. Accordingly, the securing plate 212 of the base 21 is snugly secured on the rear cover 40 and horizontally extends backwards from the rear cover 40, and the extending plate 223 vertically extends downwards from the second securing plate 212.

Figure 6:
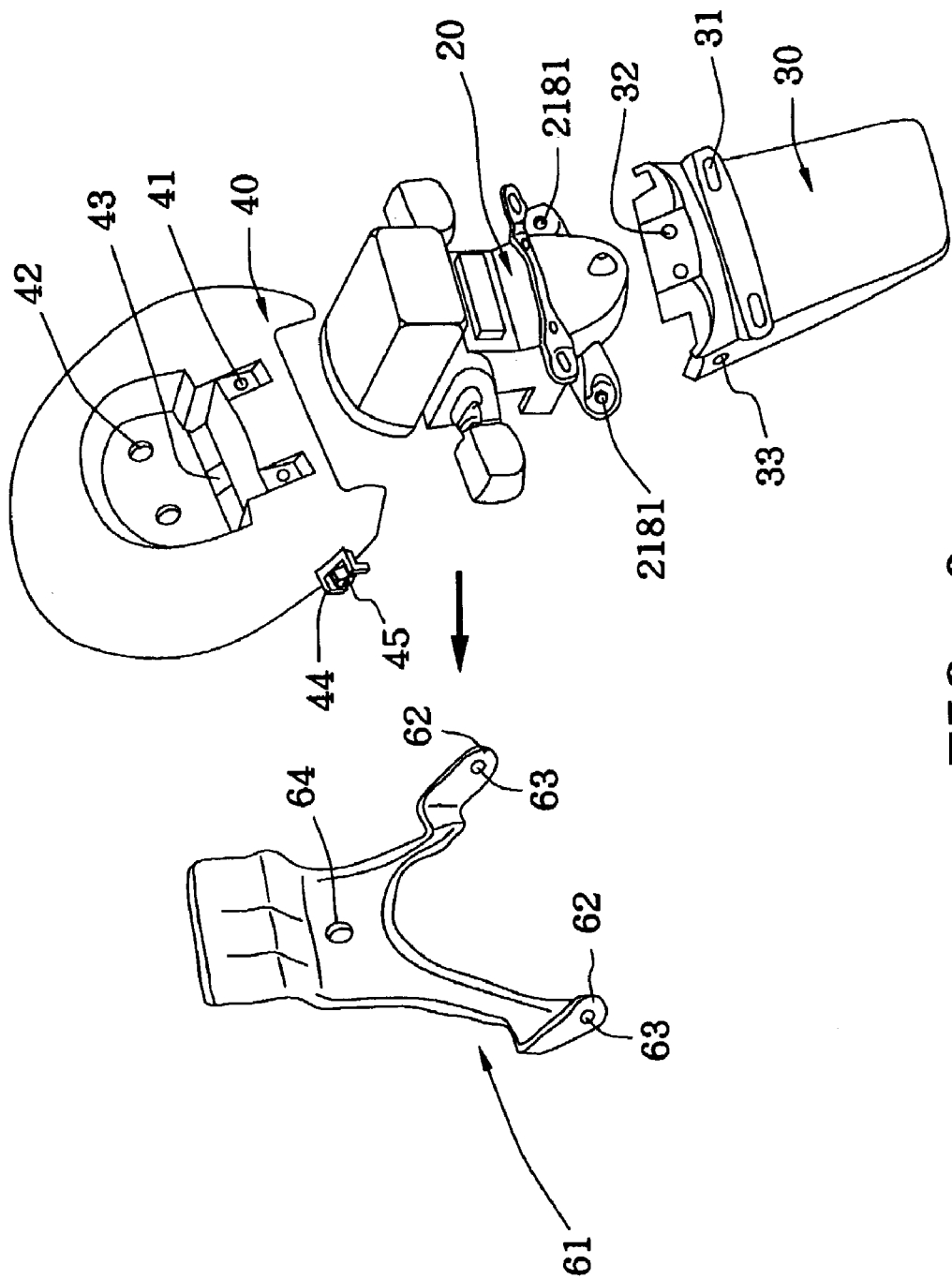
FIG. 6 illustrates the assembly manner of the tail light structure of a motorcycle in accordance with the present invention.

FIG. 6 is an explosive view of the integrated tail light module to illustrate the details and the connecting manner of each component. The rear cover 40 concaves to receive the tail light structure 20, in addition, the rear cover 40 includes two first screw holes 42, an opening 43, two second screw holes 41 and two connecting ears 44, the two screw holes 42 corresponding to the screw holes 2111 shown in FIG. 3 to combine the rear cover 40 and the tail light structure 20. The opening 43 allows the plugs 26, 27 to pass through and electrically connect to the circuitry of the motorcycle. The fender 30 includes two third screw holes 31, two fourth screw holes 32 and two fifth screw holes 33, the two third screw holes 31 corresponding to the screw holes 2181 of the tail light structure 20 to connect each other, the fourth screw holes 32 corresponding to the second screw holes 41 to connect the rear cover 40 and the fender 30, and the fifth screw holes 33 is set on both sides of the fender 30. The integrated module of the tail light structure 20, the fender 30 and the rear cover 40 can be fixed to a connecting rack 61 having two connecting legs 62, and each connecting leg 62 includes a sixth screw hole 63 corresponding to the connecting ear 44 and the fifth screw hole 45. Therefore, the fender 30 and the rear cover 40 can be secured to the connecting rack 61 by a screw 45, which can be equipped on the connecting ear 44. The connecting rack further includes a seventh screw hole 64 to fix it to the frame of the motorcycle.

The manner of combining the tail light structure 20, the fender 30 and the rear cover 40 as an integrated module and sequentially securing the integrated module to the connecting rack 61 can simplify the manufacturing process as well as enhance the rigidity of the integrated components.

Figure 7A:
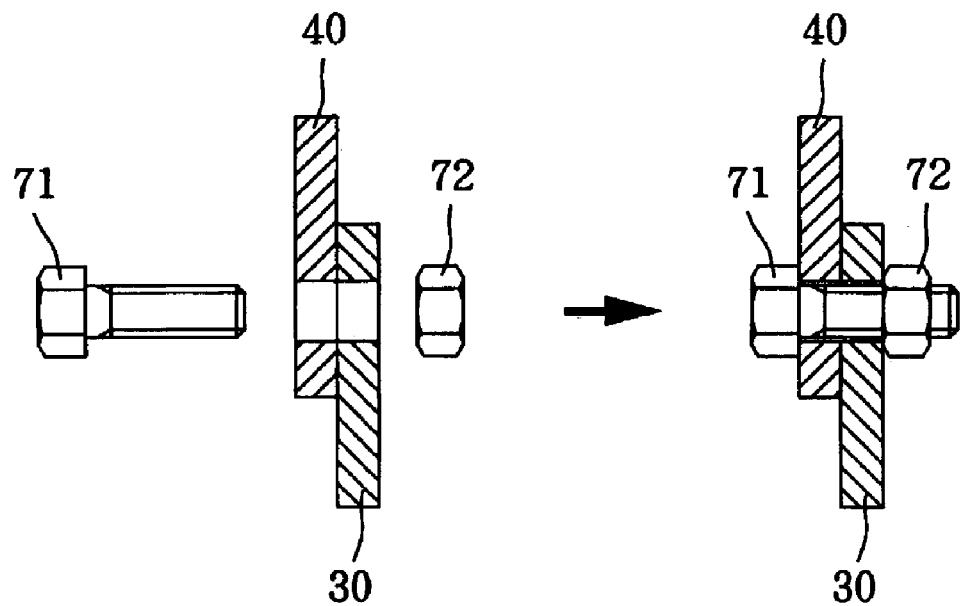
FIG. 7(a) and FIG. 7(b) illustrate the ways of connecting the fender and the rear cover in accordance with the present invention.
Figure 7B:
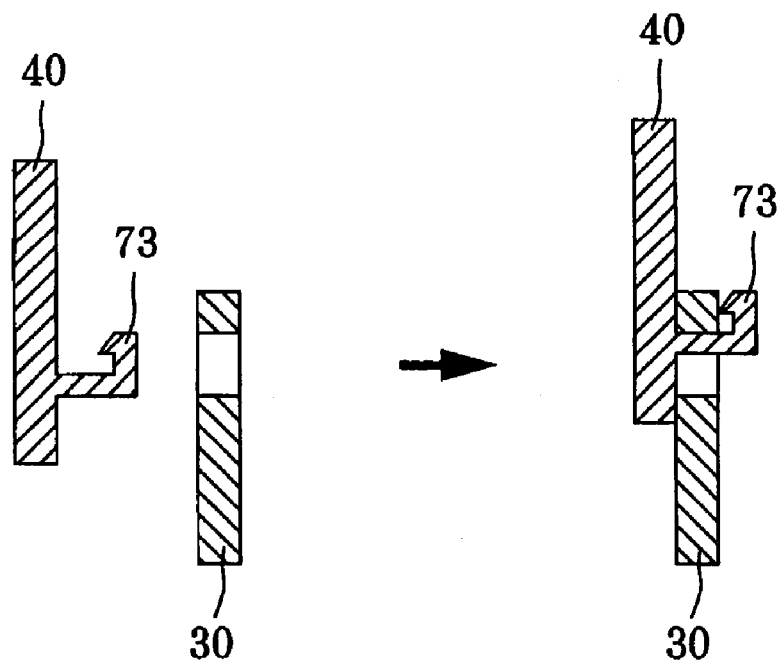

Referring to FIG. 7(a) and FIG. 7(b), which show the ways of connecting the fender 30 and the rear cover 40. In FIG. 7(a), a bolt 71 and a nut 72 are used to secure the fender 30 and the rear cover 40. In FIG. 7(b), the rear cover 40 is provided with a hook 73 to connect the fender 30. Sequentially, the integrated module of the fender 30 and the rear cover 40 can be secured to the connecting rack 61 by bolts, hooks or the like as well.

Figure 8:
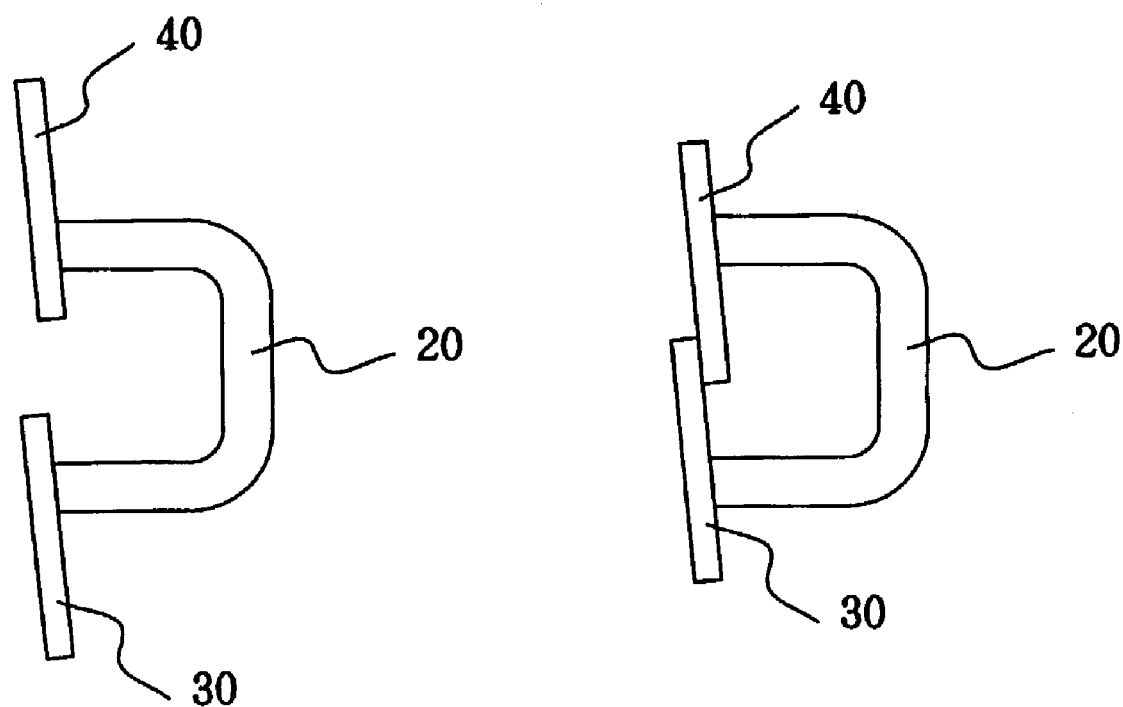
FIG. 8 illustrates the connected status of the fender, the rear cover and the base in accordance with the present invention.

Furthermore, when the tail light structure 20, the fender 30 and the rear cover 40 are combined as an integrated module, the rear cover 40 and the fender can be either in contact with or separable from each other as shown in FIG. 8.

The above-described embodiments of the present invention are intended to be illustrative only. Numerous alternative embodiments may be devised by those skilled in the art without departing from the scope of the following claims.

What is claimed is:

1. A tail light structure of a motorcycle comprising:
   a base, including;
   a first securing plate disposed approximately vertically;
   a second securing plate, the front of the second securing plate being connected to the bottom of the first securing plate; and
   an extending plate disposed below the rear of the second securing plate; and
   a tail light equipped on an approximately L-shaped structure constituted by the first securing plate and the second securing plate,
   wherein the extending plate includes a first extending portion and a second extending portion, the first extending portion is approximately perpendicular to the second securing plate, the top of the second extending portion is connected to the bottom of the first extending portion, and the second extending portion tilts at an angle toward the first extending portion, and
   further including an optical reflection plate adhered to the first extending portion.

2. The tail light structure of a motorcycle in accordance with claim 1, wherein the angle between the first extending portion and the second extending portion is within a range of 12 to 18 degrees.

3. The tail light structure of a motorcycle in accordance with claim 1, wherein the rear bottom surface of the tail light includes a transparent board.

4. The tail light structure of a motorcycle in accordance with claim 1, wherein the first securing plate includes at least one screw bole for securing the first securing plate to a rear cover of the motorcycle.

5. The A tail light structure of a motorcycle, comprising:
   a base, including;
   a first securing plate disposed approximately vertically;
   a second securing plate, the front of the second securing plate being connected to the bottom of the first securing plate; and
   an extending plate disposed below the rear of the second securing plate; and
   a tail light equipped on an approximately L-shaped structure constituted by the first securing plate and the second securing plate,
   wherein the extending plate includes a first extending portion and a second extending portion, the first extending portion is approximately perpendicular to the second securing plate, the top of the second extending portion is connected to the bottom of the first extending portion, and the second extending portion tilts at an angle toward the first extending portion, and further including a license frame secured on the second extending portion.

6. A tail light structure of a motorcycle, comprising:

a base, including;

a first securing plate disposed approximately vertically;

a second securing plate, the front of the second securing plate being connected to the bottom of the first securing plate; and an extending plate disposed below the rear of the second securing plate; and a tail light equipped on an approximately L-shaped structure constituted by the first securing plate and the second securing plate, wherein the extending plate includes a first extending portion and a second extending portion, the first extending portion is approximately perpendicular to the second securing plate, the top of the second extending portion is connected to the bottom of the first extending portion, and the second extending portion tilts at an angle toward the first extending portion, and wherein the second extending portion includes a convex for supporting a license plate.

7. A tail light structure of a motorcycle, comprising:

a base, including:

a first securing plate disposed approximately vertically;

a second securing plate, the front of the second securing plate being connected to the bottom of the first securing plate; and an extending plate disposed below the rear other second securing plate; and a tail light equipped on an approximately L-shaped structure constituted by the first securing plate and the second securing plate, wherein the base further includes a side portion which includes peripheries of the first securing plate and the second securing plate and a side of the extending plate and is approximately perpendicular to the first securing plate, the second securing plate and the extending plate, and further including two rear indicators connected to the side portion.

8. In a motorcycle or scooter, the improvements comprising:

a rear wheel;

a rear cover disposed above the rear wheel;

a fender disposed along at least one part of the rear wheel;

a base connected to the rear cover and the fender; and a tail light secured on the base, wherein the base comprises:

a securing plate snugly secured on the rear cover and extending backwards from the rear cover approximately horizontally; and an extending plate for securing the fender and extending downwards from the securing plate approximately vertically.

9. The motorcycle or scooter in accordance with claim 8, wherein the fender is connected to the rear cover.

10. The motorcycle or scooter in accordance with claim 9, further comprising a connecting rack connected to the rear cover and the fender and being separable from the base.

11. The motorcycle or scooter in accordance with claim 8, further comprising two rear indicators connected to the base.

12. The motorcycle or scooter in accordance with claim 8, further comprising a license frame scoured on the base.

13. The motorcycle or scooter in accordance with claim 8, further comprising an optical reflection plate adhered on the base.

14. The motorcycle or scooter in accordance with claim 8, wherein the base is integrally formed by resin.

* * * * *